Nov. 12, 1940.　　　G. G. COOMBE　　　2,221,043

OVERHEAD CONVEYER

Filed Oct. 22, 1938

INVENTOR.
George G. Coombe.
BY Richey & Watts
ATTORNEYS.

Patented Nov. 12, 1940

2,221,043

UNITED STATES PATENT OFFICE 2,221,043

OVERHEAD CONVEYER

George G. Coombe, Elizabeth, N. J., assignor to The American MonoRail Company, Cleveland, Ohio, a corporation of Ohio Application October 22, 1938, Serial No. 236,498

2 Claims. (Cl. 191—2)

This invention relates to overhead conveyers such as monorail systems, and more particularly to the power supply for electrified monorail systems.

In electrified overhead conveyer systems such as monorail systems, power is ordinarily supplied to one or more motors on the trolley or carriage by bus bars or wires arranged on either side of the track from which the carriage is suspended. In some electrification systems, for example in systems designed for three phase alternating current or three wire systems for two phase alternating current, three bus bars or wires adjacent the track are required. Ordinarily two conductors are placed on one side and the third on the other side of the track. Such a system operates satisfactorily if the connections between the power lines and the bus bars are not interchanged, and so long as the trolley is not turned around the track. However track layouts are frequently arranged so that the trolley may be reversed in its travel and such layouts ordinarily involve interchanging the connections between the bus bars and the power supply lines. For example, a reversal may occur in systems embodying loops or Y-switches in the track. Obviously the collector shoes will not engage the proper bus bars or trolley wires of a three conductor system after such a rerversal takes place.

It is therefore an object of my invention to provide an overhead conveyer system for a three wire circuit in which the trolley may be reversed on the track or the connections between the bus bars or trolley wires and the power supply lines may be interchanged without affecting the operation of a motor mounted on the trolley and without affecting any of the electrical controls. A further object of my invention is to provide such a system for alternating current circuits in which the phase sequence of the power supply to motors or controls mounted on the trolley will not be changed even though the trolley be reversed on the track or even though the phase sequence of the power supply to the bus bars is reversed in different sections of the track. Another object is to provide such an apparatus which can be constructed at comparatively low cost, utilizing standard control equipment, and which will be dependable and foolproof in operation.

Figure 1:
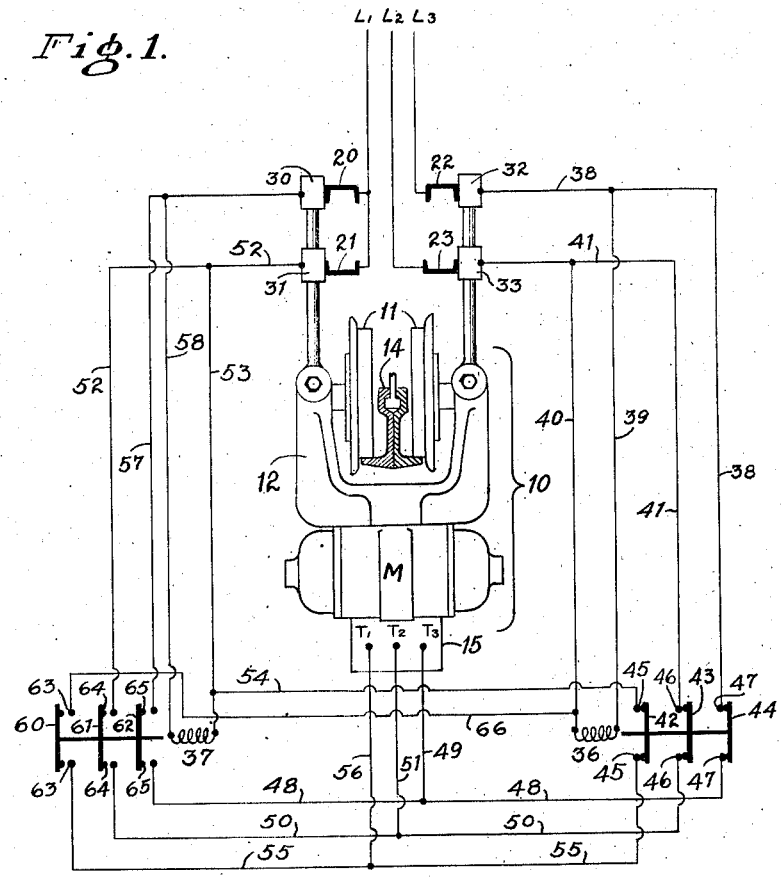
Figure 2:
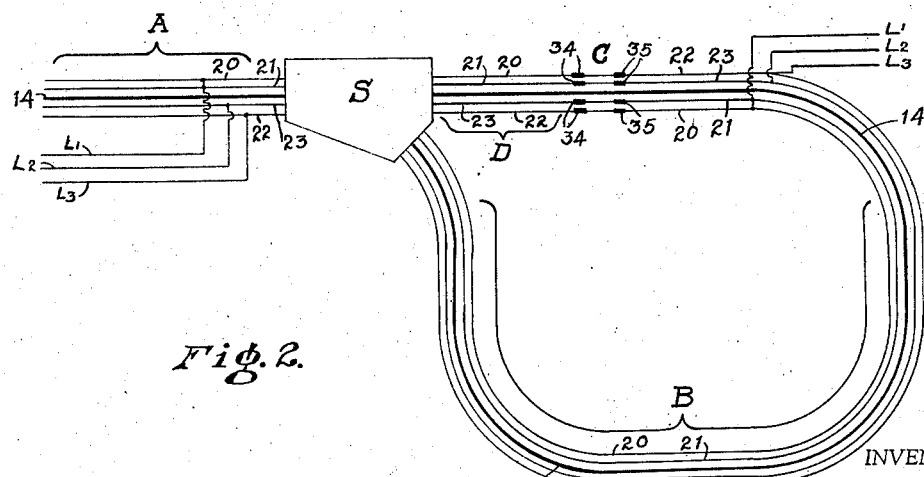

Further objects and advantages of my invention will become apparent from the following description of a preferred form thereof, reference being made to the accompanying drawing wherein Figure 1 is a diagrammatic end elevation of a monorail carriage embodying my electrification system; and Figure 2 is a diagrammatic plan of a track layout showing an adaptation of my control system.

In the drawing, the invention is shown as applied to a three phase alternating current electrification system, the three power supply lines being indicated by L1, L2 and L3. The system is also described herein as it may be applied to a well known type of monorail trolley indicated generally at 10 and comprising wheels 11 mounted on a frame 12 and running on a track 14 of inverted T-section. The frame 12 supports a motor M, the power of which may be utilized for driving the trolley along the track or for operating a hoist or for any desired purpose. The motor may be provided with any suitable automatic or manual controls such as starting and reversing switches, limit switches, etc., which may be contained within the control box 15. The particular type of controls employed in conjunction with the motor form no part of the present invention, and therefore will not be described herein. It is to be noted however that the motor or the control box is provided with three terminals T1, T2 and T3 which, for satisfactory operation, should always be connected to the same power supply lines. For example in the drawing, the circuit is arranged so that L1 is always connected to T1, L2 to T2, and L3 to T3. It is important that no reversal of these connections occur, otherwise the controls may not operate correctly or the direction of rotation of the motor may be reversed.

To insure that the proper power lines will always be connected to the corresponding terminal of the control box, I preferably employ the wiring arrangement illustrated in Figure 1 in conjunction with the electrification system shown diagrammatically in Figure 2. Preferably the electrification system includes four conductors, shown herein as rigid bus bars 20, 21, 22 and 23, two on either side of the track, the conductors being engaged by suitable current collecting means, such as collector shoes 30, 31, 32 and 33, respectively, when the trolley is in the position shown in Figure 1. For convenience of illustration the bus bars are illustrated in Figure 2 as being horizontally spaced instead of being disposed in pairs one above the other as shown in Figure 1.

It will be evident that by employing four bus bars as shown, each collector shoe will always be in engagement with a bus bar regardless of the direction of travel of the trolley along the track. However, in the track layout shown, if the trolley should pass from the region marked A through the switch S onto the loop portion indicated at B, then the trolley will be turned around with respect to the track by its travel. Also, at some point in the loop the bus bars must be broken and the phase relationship of the current supplied to the bus bars must be reversed. Otherwise, short circuits would occur. To eliminate possibility of short circuits, I preferably employ a dead section of track C, the dead section being of sufficient length to prevent the collector shoes from making connections between the adjacent live sections and being separated from the conducting sections on either side by insulating blocks indicated diagrammatically at 34 and 35.

It will be noted that as the carriage passes from the section B of the track across the dead section C and onto section D adjacent the switch, the fact that the trolley has been turned around will result in power lines being connected through the bus bars at different collector shoes. Thus reversal of the trolley will interchange the relative position of the bus bars and the trolley so that collector shoes 30 and 31 will engage bus bars 22 and 23, respectively, and collector shoes 32 and 33 will engage bus bars 20 and 21, respectively. The same interchange will occur whenever the trolley passes across the dead section C of the track in either direction.

To prevent any interchange in the relative position of the bus bars and the trolley from changing the phase relationship of the current as it is supplied to the terminals T1, T2 and T3, I preferably connect line L1 to bus bars 20 and 21, L2 to bus bar 23, and L3 to bus bar 22 and employ on the carriage two magnetic switches 37 and 36 which are actuated by current flowing between collector shoes 30 and 31 and 32 and 33, respectively. The lines leading from the collector shoes are arranged in such a manner that the connections between the collector shoes and the motor terminals are changed so that the current in line L1 will always be supplied to terminal T1, in line L2 to terminal T2, and in line L3 to terminal T3.

Thus, when the carriage is in the position shown in Figure 1 of the drawing, the magnetic switch 36 will be energized, for it is connected, through collector shoes 32 and 33 and conductors 38, 39, 40 and 41, across bus bars 22 and 23, which are in turn energized by L3 and L2. When the switch is energized, the contactors 42, 43 and 44 close the circuits between the pairs of contacts 45, 46 and 47, respectively, thus completing the circuits to the terminals T1, T2 and T3 as follows: From L3 through bus bar 22 and collector shoe 32, conductor 38 through the contactor 44, and conductors 48 and 49 to terminal T3. From L2 through bus bar 23, collector shoe 33, conductor 41, contactor 43, and conductors 50 and 51 to terminal T2. From L1 through bus bar 21, collector shoe 31, conductors 52, 53, 54, contactor 42, and conductors 55 and 56 to terminal T1.

Under these circumstances, switch 37 will be open inasmuch as it is connected across bus bars 20 and 21 through collector shoes 30 and 31 and conductors 52, 53, 57 and 58. Since the bus bars 20 and 21 are both connected to line L1, no current will flow through the coil of magnetic switch 37.

If the carriage is reversed on the track or passes from across the dead section C, so that collector shoes 32 and 33 engage bus bars 20 and 21, respectively, while collector shoes 30 and 31 engage bus bars 22 and 23, respectively, then switch 36 will be de-energized thus opening the three circuits through contactors 42, 43 and 44, while switch 37 will be energized to move the contactors 60, 61 and 62 into engagement with the pairs of contact points 63, 64 and 65, respectively. Under these circumstances current will flow from line L3, through bus bar 22, collector shoe 30, conductor 57, contactor 62, and conductors 48 and 49 to terminal T3. From L2 current will flow through bus bar 23, collector shoe 31, line 52, contactor 61 and conductors 50 and 51 to the terminal T2, and from L1 current will flow through bus bar 21, collector shoe 33, conductors 41, 40 and 66, contactor 60 and conductors 55 and 56 to terminal T1. Thus the phase relationship of the current supplied to the motor or controls will automatically be maintained without change regardless of the interchange or reversal of the position of the trolley and bus bars with respect to each other. The respective terminals will always be supplied with power from the same power lines, and the interchanging of connections between bus bars and collectors will not affect either the controls or the direction of operation of any motors mounted on the carriage.

It is to be noted that the bus bar 20 functions chiefly to provide a support for the collector shoes 30 or 32 as the case may be. Accordingly, the bus bar 20 may be omitted if means are provided for preventing the collector shoe, which would otherwise be in contact therewith, from coming into engagement with any conductor which would permit current to flow from bus bar 21 to energize either magnetic switch 36 or 37. For example, when the trolley is in the position shown in Figure 1, the switch 37 would remain de-energized whether the collector shoe 30 engages the bus bar 20 or nothing at all. In either case, no current will flow through the switch.

From the foregoing description of a preferred form of my invention, it will be seen that I have provided a simple automatic system of overhead conveyer electrification wherein reversal of the trolley on the track or interchange of the relative positions of the bus bars and the trolley will not change the operation of the electrical apparatus. Furthermore my system is relatively inexpensive as it embodies simple wiring and simple magnetic switches which may be of standard construction. The system is entirely automatic and completely foolproof and eliminates the difficulties which heretofore have been encountered particularly in connection with alternating current electrification systems.

In the foregoing specification I have described in detail a preferred form of my apparatus and electrification system. Various changes and modifications may be made therein without departing from the spirit and scope of my invention. It is therefore to be understood that the foregoing description is given by way of example only and that my patent is not to be limited by such description or in any manner other than by the scope of the appended claims.

I claim:

1. In a monorail system having a track, a trolley operable on said track and a motor carried by said trolley, an electrification system including a three wire alternating current power supply system, four bus bars extending along said track, two bus bars being disposed one above the other on one side of the track and the remaining two bus bars being similarly disposed on the other side of the track, one of said power supply wires being connected to two of said bus bars, the remaining power supply wires being separately connected to the other two bus bars, four collector shoes carried by said trolley and engaging said bus bars, connections between said collector shoes and said motor and means including two magnetic switches, one operable by current flowing between the two of said collector shoes, and the other operable by current flowing between the other two said collector shoes, for changing said connections to prevent change in the phase relationship of the current supplied to said motor regardless of interchange of engagement between said bus bars and said collector shoes.

2. In a monorail system having a track, a trolley operable on said track and which may be turned around with respect thereto, and a motor carried by said trolley, an electrification system including a three wire alternating current power supply system, four bus bars extending along said track, two bus bars being disposed one above the other on one side of the track and the remaining two bus bars being similarly disposed on the other side of the track, one of said power supply wires being connected to two bus bars on one side of the track, the remaining power supply wires being separately connected to the other two bus bars, four collector shoes carried by said trolley and engaging said bus bars, connections between said collector shoes and said motor and means including two magnetic switches, one operable by current flowing between the two said bus bars on one side of the track, and the other operable by current flowing between the other two said bus bars, for changing said connections to prevent change in the phase relationship of the current supplied to said motor regardless of the position of said trolley with respect to said track.

GEORGE G. COOMBE.